United States Patent [19]

Imai

[11] Patent Number: 4,603,948
[45] Date of Patent: Aug. 5, 1986

[54] LARGE-APERTURE WIDE-ANGLE ZOOM LENS SYSTEM

[75] Inventor: Toshihiro Imai, Tokyo, Japan

[73] Assignee: Olympus Optical Co., Ltd., Tokyo, Japan

[21] Appl. No.: 571,116

[22] Filed: Jan. 16, 1984

[30] Foreign Application Priority Data

Jan. 18, 1983 [JP] Japan ................................ 58-5290
Aug. 3, 1983 [JP] Japan ............................ 58-141141

[51] Int. Cl.⁴ ...................... G02B 13/04; G02B 15/14
[52] U.S. Cl. ...................................... 350/426; 350/458
[58] Field of Search ...................... 350/426, 423, 458

[56] References Cited

U.S. PATENT DOCUMENTS

| 4,147,410 | 4/1979 | Shimomura et al. | 350/426 |
| 4,315,669 | 2/1982 | Fujii | 350/426 |
| 4,484,799 | 11/1984 | Doi et al. | 350/426 |

FOREIGN PATENT DOCUMENTS 53-39759 4/1978 Japan.
55-113012 9/1980 Japan.
57-161718 10/1982 Japan.

Primary Examiner—John K. Corbin
Assistant Examiner—Rebecca D. Gass
Attorney, Agent, or Firm—Cushman, Darby & Cushman

[57] ABSTRACT

A large-aperture wide-angle zoom lens system designed for a field angle of 73° to 48° and F/2.8, and having favorably corrected aberrations. Said zoom lens system comprises a front diverging lens group and a rear converging lens group, and is designed for performing zooming by varying an airspace reserved between both the lens groups, said rear converging lens group comprising a first subgroup comprising two positive lens components, a second subgroup comprising two negative lens components and a third subgroup comprising two positive lens components.

16 Claims, 11 Drawing Figures

LARGE-APERTURE WIDE-ANGLE ZOOM LENS SYSTEM

BACKGROUND OF THE INVENTION (a) Field of the invention

The present invention relates to a large-aperture wide-angle zoom lens system designed for a field angle larger than 70° and a relative aperture of F/2.8.

(b) Description of the prior art

In the recent years, remarkable progress has been made in the field of zoom lens systems in which numerous researches have been made for development of new lens systems. However, the researches have been made chiefly for developing new lens systems having higher zooming ratios and are still insufficient for developing zoom lens systems having large relative apertures. Under the present circumstance, zoom lens systems are generally evaluated as those having relatively small relative apertures. Large relative apertures are demanded especially for the zoom lens systems having field angles larger than 70° at the wide position. However, it is rather hard to realize such a zoom lens system.

As a zoom lens system which is similar to that according to the present invention, there is known the ones, for example, disclosed by Japanese Unexamined Published Patent Applications No. 113012/80 and No. 161718/82. However, each of these lens systems has a small relative aperture of F/4. Further, the zoom lens system disclosed by Japanese Unexamined Published Patent Application No. 39759/78 has a relatively large relative aperture but is designed for a small zooming ratio of 1.528.

A zoom lens system comprising a front diverging lens group and a rear converging lens group, like that according to the present invention is focused generally by displacing the front lens group. In case of a wide-angle zoom lens system, however, curvature of field is remarkably varied by focusing the lens system from an object located at infinite distance onto another located at a short distance by displacing the front lens group as described above. Therefore, quality of an image formed by offaxial rays is remarkably degraded in a zoom lens system having a relative aperture on the order of F/2.8 though deviation of the image plane due to curvature of field is within the depth of focus in a zoom lens system having a relative aperture on the order of F/4. This fact constitutes hindrance to design of a zoom lens system having a large relative aperture.

There have conventionally been known zoom lens systems comprising two lens groups in which an airspace reserved in the front diverging lens group is varied for correcting curvature of field which is aggravated in conjunction with the displacement of the front diverging lens group for focusing. Zoom lens systems of this type is exemplified by the one disclosed by Japanese Unexamined Published Patent Application No. 32342/77. In this zoom lens system, however, magnification of the rear lens group has different magnification levels at the wide position, standard position and tele position respectively. Accordingly, the rear lens group causes different influences on aberrations in the entire lens system at different zooming conditions, thereby making different degrees of aberrations to be corrected at the individual conditions. This makes it difficult to find out an airspace and its variation ratio for favorably correcting aberrations in all the zooming conditions.

Moreover, there has already been known a zoom lens system comprising two lens groups in which the rear lens group is further divided into two groups, and an airspace reserved between these two groups is varied to correct aberrations which are aggravated by focusing the lens system on an object located at a short distance. However, this lens system actually comprises three lens groups in place of two lens groups, and therefore requires a complicated mechanism for zooming.

SUMMARY OF THE INVENTION

A general object of the present invention is to provide a large-aperture wide-angle zoom lens system having a large relative aperture of F/2.8, field angles within a range from 73.4° to 48.4° and favorably corrected aberrations, especially distortion.

In order to prevent the front lens from having a large diameter and the entire lens system from having a long total length, a zoom lens system should desirably comprise a front diverging lens group and a rear converging lens group, and perform zooming by varying the airspace reserved between the front and rear lens groups. In short, a zoom lens system should preferably comprise two lens groups. The present invention has adopted a zoom lens system comprising these two lens groups.

When it is attempted to design the zoom lens system comprising two lens groups so as to have a large relative aperture, a problem is posed to correct spherical aberration and coma in the rear lens group. The present invention has selected the triplet type in which aberrations are not aggravated so much when the rear lens group is focused on an object located at a short distance. Speaking more concretely, the present invention has selected a rear lens group which comprises a first positive subgroup, a second negative subgroup and a third positive subgroup. In addition, each subgroup comprises plural lens components having the same positive or negative sign. That is, the first subgroup comprises plural positive lens components, the second subgroup comprises plural negative lens components and the third subgroup comprises plural positive lens components. The reason for selecting this composition is that aberrations are aggravated and hardly correctable when rays are converged or diverged with a single lens surface or element only since rays having a large diameter and various conditions pass through the rear lens group in the lens system comprising two lens groups.

The zoom lens system according to the present invention comprises two lens groups as described above, the rear lens group having the above-described composition in which the lens component arranged on the image side in the first positive subgroup is designed as a positive cemented doublet or split doublet comprising an air lens having weak power for correcting aberrations more favorably. This is because the lens component arranged on the image side in the first positive subgroup has a remarkable effect for correcting paraxial spherical aberration, aberrations due to offaxial marginal rays and chromatic aberration since the rear lens group has a magnification level lower than 1 and the rays passing through the first positive subgroup has a diameter far larger than that of the rays passing through the third positive subgroup. Further, astigmatism can be corrected by designing said positive lens component so as to have a large thickness, which minimizes diameter of the rays, thereby making it possible to prevent spherical aberration from being overcorrected in the vicinity of the second negative subgroup arranged on the image side of said lens component.

Furthermore, the zoom lens system according to the present invention comprises a front lens group comprising four lens components: a positive meniscus lens component, a negative meniscus lens component, a negative lens component arranged with an airspace and a positive meniscus lens component.

The positive meniscus lens component arranged on the extreme object side serves for reducing barrel type distortion known as a defect of the wide-angle zoom lens systems comprising two lens groups.

Further, functions to correct spherical aberration and astigmatism have been enhanced by arranging the negative lens component and positive meniscus lens component (third and fourth lens components) apart from the negative lens component (second lens component) in the front lens gorup.

The zoom lens system according to the present invention comprising the front lens group and rear lens group having the above-described compositions can further be improved by designing it so as to satisfy the following conditions:

$$0.1 < K < 0.6 \left( K = \frac{r_2 - r_1}{r_1 + r_2} \right) \quad (1)$$

$$0.12 < \frac{D}{f_R} < 0.3 \quad (2)$$

$$0.8 < \frac{r_{17}}{f_W} < 1.8 \quad (3)$$

$$0.6 < \frac{r_{15}}{r_{17}} < 1.5 \quad (4)$$

wherein the reference symbols are defined as follows:
$r_1$ and $r_2$: radii of curvature on both the surfaces respectively of the first lens component arranged in the front lens group
$r_{15}$: radius of curvature on the image side surface of the lens component arranged on the object side in the second subgroup of the rear lens group
$r_{17}$: radius of curvature on the image side surface of the lens component arranged on the image side in the second subgroup of the rear lnes group
D: thickness of the lens component arranged on the image side in the first subgroup of the rear lens group
$f_R$: focal length of the rear lens group
$f_W$: focal length of the entire zoom lens system at its wide position The parameter K used in the above-mentioned condition (1) is used for determining form of the positive meniscus lens component arranged as the first lens component in the front lens group. If this parameter K exceeds 0.6, it will be impossible to correct the barrel type distortion at the wide position of the zoom lens system. If the parameter K is smaller than 0.1, in contrast, the image plane will be curved at the marginal portions when the zoom lens system is set at the wide position.

D defined by the condition (2) represents thickness of the positive lens component arranged on the image side in the first subgroup of the rear lens group. This lens component is designed as a cemented doublet or split doublet to form an air lens between the lens elements. In the latter case, D represents thickness of the split lens component comprising the air lens. If value of $D/f_R$ exceeds 0.3 defined as the upper limit of the condition (2), the total length of the zoom lens system as a whole will be too long, quantity of the marginal rays will be insufficient and the front lens will have a large diameter. If $D/f_R$ has a value smaller than 0.12, in contrast, the above-mentioned astigmatic difference correcting function will be too weak.

The conditions (3) and (4) are effective only when they are satisfied at the same time. In the triplet type of rear lens group, aberrations are produced mostly by the second subgroup. Especially when the lens system has a large aperture and a wide angle, aberrations are produced remarkably by the second lens group. The present invention has selected a composition comprising two or more negative lens components for the second subgroup in order to distribute negative power. When the negative power is distributed unequally among the surfaces of these two or more lens components, however, the effect obtained by distributing the power among two or more lens component is weakened. For this reason, the condition (4) defines ratio between radii of curvature $r_{15}$ and $r_{17}$ of the image side surfaces of these negative lens components to prevent it from becoming too large or too small. The image side surfaces of these negative lens components have angles of incidence which are largely different between the paraxial rays and offaxial rays, thereby making it difficult to properly balance the aberrations in each zooming condition. In addition to the condition (4) defining ratio between $r_{15}$ and $r_{17}$ which is required for properly balancing aberrations, values of $r_{15}$ and $r_{17}$ need be defined within certain definite ranges. For this purpose, it is necessary to select $r_{17}/f_W$ so as to satisfy the condition (3). If $r_{17}/f_W$ has a value smaller than 0.8 defined as the lower limit of the condition (3), aberrations will not be balanced properly. If $r_{17}/f_W$ has a value exceeding 1.8 defined as the upper limit of the condition (3), in contrast, the negative subgroup will have too weak power to obtain a sufficient back focal length and the principal point of the rear lens group will be shifted toward the image side, making it impossible to obtain a sufficient zooming ratio.

If $r_{15}/r_{17}$ has a value smaller than the lower limit of the condition (4), the surface $r_{15}$ will have too strong power to properly balance aberrations. If the upper limit of the condition (4) is exceeded, in contrast, the surface $r_{15}$ will have too weak power to obtain a sufficient zooming ratio.

The zoom lens system according to the present invention described above can accomplish the object of the present invention, i.e., provision of a large-aperture wide-angle zoom lens system. However, the zoom lens system comprising such two lens groups has a defect that its image plane is curved on the positive side (opposite to the lens system) when it is focused on an object located at an extremely short distance. In order to correct this defect, it is necessary to adopt a focusing method for focusing on an object located at an extremely short distance (so-called macro photographing) in addition to the ordinary focusing method for focusing on an object located at an ordinary distance.

For setting the zoom lens system according to the present invention at its wide position, the first positive subgroup only is displaced toward the object side in the rear lens group for focusing on an object located at an extremely short distance. This means makes it possible to focus the lens system on an object located at an extremely short distance without aggravating aberrations and with only short displacement.

The zoom lens system according to the present invention is compatible with the following focusing method assuring little variation of aberrations. Speaking concretely, the method is constituted by varying a specific airspace in the rear lens group in conjunction with the displacement of the front lens group. In this case, it is necessary to select an airspace whose variation does not cause variations of correction degrees of aberrations in each zooming condition. This method makes it possible to obtain a zoom lens system in which aberrations are scarcely varied in all zooming conditions.

Further, it is preferable to select an airspace through which the paraxial rays pass nearly in parallel with the optical axis as the variable airspace for focusing since back focal length $f_B$ is not varied by varying said airspace. When focal length of the lens system arranged on the object side of said variable airspace in each zooming condition is represented by $f_i$ and focal length of the entire zoom lens system in that condition is designated by $f_{ti}$ in this case, ratio $|f_i/f_{ti}|$ smaller than 3.5 at each condition is not desirable since the paraxial rays are not parallel with the optical axis in said air space at such a ratio. Ratio of $|f_i/f_{ti}|$ exceeding 3.5 in each condition is desirable since it permits limiting variation of $f_B$ within 1/12 of the variation of the airspace.

So long as the paraxial rays are parallel or nearly parallel with the optical axis in the variable airspace as described above, curvature of field can easily be corrected since spherical aberration remains unchanged even when the airspace is varied and consideration is required for curvature of field only.

DETAILED DESCRIPTION OF THE PREFERRED EMBODIMENTS

Figure 1:
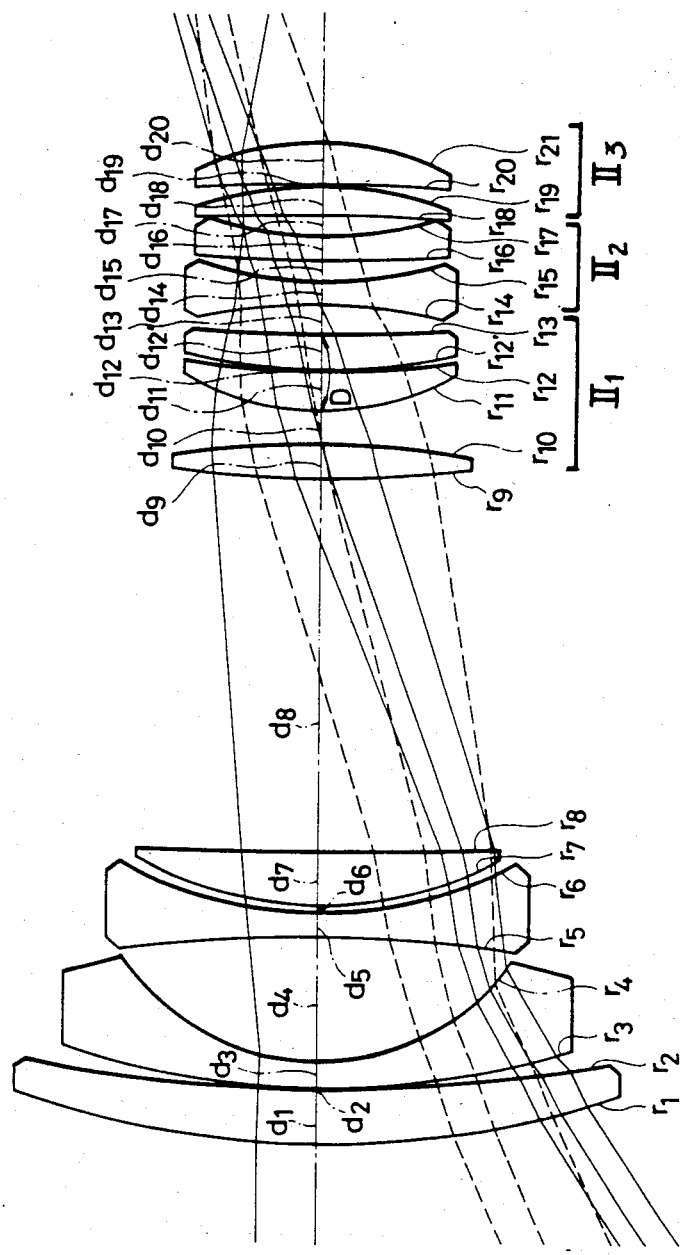
FIG. 1 shows a sectional view illustrating composition of Embodiments 1 and 2 at the wide position of the zoom lens system according to the present invention.

Now, numerical data will be described below as preferred embodiments of the zoom lens system according to the present invention:

| Embodiment 1 | | |
|---|---|---|
| $r_1 = 86.46$ | | |
| $d_1 = 4.3$ | $n_1 = 1.79952$ | $\nu_1 = 42.24$ |
| $r_2 = 132.183$ | | |
| $d_2 = 0.1$ | | |
| $r_3 = 71.220$ | | |
| $d_3 = 2.3$ | $n_2 = 1.79952$ | $\nu_2 = 42.24$ |
| $r_4 = 21.620$ | | |
| $d_4 = 10.16$ | | |
| $r_5 = -134.878$ | | |
| $d_5 = 1.9$ | $n_3 = 1.61272$ | $\nu_3 = 58.75$ |
| $r_6 = 35.017$ | | |
| $d_6 = 0.68$ | | |
| $r_7 = 31.687$ | | |
| $d_7 = 4.5$ | $n_4 = 1.80440$ | $\nu_4 = 39.58$ |
| $r_8 = 863.805$ | | |
| $d_8 = 1$ | | |
| $r_9 = 105.586$ | | |
| $d_9 = 2.8$ | $n_5 = 1.67790$ | $\nu_5 = 55.33$ |
| $r_{10} = -73.593$ | | |
| $d_{10} = 2.7$ | | |
| $r_{11} = 23.548$ | | |
| $d_{11} = 3.11$ | $n_6 = 1.67790$ | $\nu_6 = 55.33$ |
| $r_{12} = 60.879$ | | |
| $d_{12} = 0.1$ | | |
| $r_{12} = 46.676$ | | |
| $d_{12} = 3.24$ | $n_7 = 1.74320$ | $\nu_7 = 49.31$ |
| $r_{13} = 200.793$ | | |
| $d_{13} = 2.36$ | | |
| $r_{14} = -52.334$ | | |
| $d_{14} = 1.93$ | $n_8 = 1.74950$ | $\nu_8 = 35.27$ |
| $r_{15} = 35.412$ | | |
| $d_{15} = 1.5$ | | |
| $r_{16} = 136.095$ | | |
| $d_{16} = 1.93$ | $n_9 = 1.80518$ | $\nu_9 = 25.43$ |
| $r_{17} = 30.396$ | | |
| $d_{17} = 1.79$ | | |
| $r_{18} = -261.802$ | | |
| $d_{18} = 2.50$ | $n_{10} = 1.67790$ | $\nu_{10} = 55.33$ |
| $r_{19} = -34.223$ | | |
| $d_{19} = 0.19$ | | |
| $r_{20} = -142.740$ | | |
| $d_{20} = 3.18$ | $n_{11} = 1.51633$ | $\nu_{11} = 64.15$ |
| $r_{21} = -25.703$ | | |

$f = 28.98 \sim 48.3$, zooming ratio = 1.67
$f_R = 37.133$, K = 0.209, $D/f_R = 0.174$
$r_{17}/f_w = 1.05$, $r_{15}/r_{17} = 1.165$

| f | 28.98 | 37.41 | 48.3 |
|---|---|---|---|
| l | 30.51 | 13.88 | 0.99 |

| Embodiment 2 | | |
|---|---|---|
| $r_1 = 87.236$ | | |
| $d_1 = 4.3$ | $n_1 = 1.8044$ | $\nu_1 = 39.58$ |
| $r_2 = 146.290$ | | |
| $d_2 = 0.1$ | | |
| $r_3 = 71.286$ | | |
| $d_3 = 2.3$ | $n_2 = 1.79952$ | $\nu_2 = 42.24$ |
| $r_4 = 21.332$ | | |
| $d_4 = 8.9$ | | |
| $r_5 = -145.246$ | | |
| $d_5 = 1.9$ | $n_3 = 1.61272$ | $\nu_3 = 58.75$ |
| $r_6 = 39.945$ | | |
| $d_6 = 1.36$ | | |
| $r_7 = 34.035$ | | |
| $d_7 = 4.51$ | $n_4 = 1.8044$ | $\nu_4 = 39.58$ |
| $r_8 = 341.904$ | | |
| $d_8 = 1$ | | |
| $r_9 = 111.555$ | | |
| $d_9 = 2.8$ | $n_5 = 1.6968$ | $\nu_5 = 55.5$ |
| $r_{10} = -93.07$ | | |

-continued

Embodiment 2

| | | |
|---|---|---|
| $d_{10} = 2.72$ | | |
| $r_{11} = 27.305$ | | |
| $d_{11} = 6.81$ | $n_6 = 1.6968$ | $\nu_6 = 55.5$ |
| $r_{12} = -660.765$ | | |
| $d_{12} = 0.1$ | | |
| $r_{12} = 154.016$ | | |
| $d_{12} = 3.2$ | $n_7 = 1.74320$ | $\nu_7 = 49.3$ |
| $r_{13} = -1831.620$ | | |
| $d_{13} = 2.38$ | | |
| $r_{14} = -36.118$ | | |
| $d_{14} = 1.93$ | $n_8 = 1.74950$ | $\nu_8 = 35.3$ |
| $r_{15} = 34.322$ | | |
| $d_{15} = 1.5$ | | |
| $r_{16} = 5343.39$ | | |
| $d_{16} = 1.93$ | $n_9 = 1.80518$ | $\nu_9 = 25.4$ |
| $r_{17} = 45.480$ | | |
| $d_{17} = 1.79$ | | |
| $r_{18} = -90.193$ | | |
| $d_{18} = 2.59$ | $n_{10} = 1.67790$ | $\nu_{10} = 55.3$ |
| $r_{19} = -32.206$ | | |
| $d_{19} = 0.19$ | | |
| $r_{20} = 193.220$ | | |
| $d_{20} = 3.18$ | $n_{11} = 1.51633$ | $\nu_{11} = 64.15$ |
| $r_{21} = -24.970$ | | |

$f = 28.98 \sim 48.3$, zooming ratio = 1.67
$f_R = 38.083$, $K = 0.253$, $D/f_R = 0.265$
$r_{17}/f_w = 1.57$, $r_{15}/r_{17} = 0.755$

| f | 28.98 | 37.41 | 48.3 |
|---|---|---|---|
| l | 30.49 | 13.84 | 0.92 |

Embodiment 3

| | | |
|---|---|---|
| $r_1 = 140.081$ | | |
| $d_1 = 4.3$ | $n_1 = 1.80400$ | $\nu_1 = 39.58$ |
| $r_2 = 500.83$ | | |
| $d_2 = 0.1$ | | |
| $r_3 = 101.646$ | | |
| $d_3 = 2.3$ | $n_2 = 1.79952$ | $\nu_2 = 42.24$ |
| $r_4 = 22.962$ | | |
| $d_4 = 10.94$ | | |
| $r_5 = -149.484$ | | |
| $d_5 = 1.91$ | $n_3 = 1.61272$ | $\nu_3 = 58.75$ |
| $r_6 = 40.481$ | | |
| $d_6 = 1.21$ | | |
| $r_7 = 36.257$ | | |
| $d_7 = 4.5$ | $n_4 = 1.80440$ | $\nu_4 = 39.60$ |
| $r_8 = 1331.308$ | | |
| $d_8 = 1$ | | |
| $r_9 = 51.611$ | | |
| $d_9 = 2.8$ | $n_5 = 1.69680$ | $\nu_5 = 55.5$ |
| $r_{10} = -159.305$ | | |
| $d_{10} = 2.7$ | | |
| $r_{11} = 31.441$ | | |
| $d_{11} = 6.94$ | $n_6 = 1.69680$ | $\nu_6 = 55.5$ |
| $r_{12} = -30.955$ | | |
| $d_{12} = 3.37$ | $n_7 = 1.74320$ | $\nu_7 = 49.3$ |
| $r_{13} = -124.705$ | | |
| $d_{13} = 2.70$ | | |
| $r_{14} = -37.439$ | | |
| $d_{14} = 1.93$ | $n_8 = 1.74950$ | $\nu_8 = 35.3$ |
| $r_{15} = 35.264$ | | |
| $d_{15} = 1.5$ | | |
| $r_{16} = 190.522$ | | |
| $d_{16} = 1.93$ | $n_9 = 1.80518$ | $\nu_9 = 25.4$ |
| $r_{17} = 39.912$ | | |
| $d_{17} = 1.79$ | | |
| $r_{18} = -62.347$ | | |
| $d_{18} = 2.59$ | $n_{10} = 1.67790$ | $\nu_{10} = 55.3$ |
| $r_{19} = -32.103$ | | |
| $d_{19} = 0.19$ | | |
| $r_{20} = 115.799$ | | |
| $d_{20} = 3.18$ | $n_{11} = 1.51633$ | $\nu_{11} = 64.15$ |
| $r_{21} = -26.387$ | | |

$f = 28.98 \sim 48.3$, zooming ratio = 1.67
$f_R = 39.18$, $K = 0.563$, $D/f_R = 0.263$
$r_{17}/f_w = 1.38$, $r_{15}/r_{17} = 0.884$

| f | 28.98 | 37.41 | 48.3 |
|---|---|---|---|

-continued

Embodiment 3

| l | 31.44 | 14.20 | 0.83 |
|---|---|---|---|

Embodiment 4

| | | |
|---|---|---|
| $r_1 = 136.89$ | | |
| $d_1 = 4.3$ | $n_1 = 1.8044$ | $\nu_1 = 39.58$ |
| $r_2 = 493.22$ | | |
| $d_2 = 0.1$ | | |
| $r_3 = 102.53$ | | |
| $d_3 = 2.3$ | $n_2 = 1.79952$ | $\nu_2 = 42.24$ |
| $r_4 = 23.11$ | | |
| $d_4 = 10.36$ | | |
| $r_5 = -191.0$ | | |
| $d_5 = 1.9$ | $n_3 = 1.61272$ | $\nu_3 = 58.75$ |
| $r_6 = 38.98$ | | |
| $d_6 = 1.6$ | | |
| $r_7 = 35.87$ | | |
| $d_7 = 4.9$ | $n_4 = 1.8044$ | $\nu_4 = 39.58$ |
| $r_8 = 490.18$ | | |
| $d_8 = 31.04 \sim 0.81$ | | |
| $r_9 = 53.95$ | | |
| $d_9 = 3.2$ | $n_5 = 1.69680$ | $\nu_5 = 55.52$ |
| $r_{10} = -141.55$ | | |
| $d_{10} = 2.7$ | | |
| $r_{11} = 30.36$ | | |
| $d_{11} = 6.78$ | $n_6 = 1.69680$ | $\nu_6 = 55.52$ |
| $r_{12} = -36.77$ | | |
| $d_{12} = 3.37$ | $n_7 = 1.74320$ | $\nu_7 = 49.31$ |
| $r_{13} = -130.49$ | | |
| $d_{13} = 2.5$ | | |
| $r_{14} = -37.62$ | | |
| $d_{14} = 1.93$ | $n_8 = 1.74950$ | $\nu_8 = 35.27$ |
| $r_{15} = 34.22$ | | |
| $d_{15} = 1.7$ | | |
| $r_{16} = 301.36$ | | |
| $d_{16} = 1.69$ | $n_9 = 1.80518$ | $\nu_9 = 25.43$ |
| $r_{17} = 41.20$ | | |
| $d_{17} = 1.79$ | | |
| $r_{18} = -71.62$ | | |
| $d_{18} = 2.31$ | $n_{10} = 1.67790$ | $\nu_{10} = 55.33$ |
| $r_{19} = -32.95$ | | |
| $d_{19} = 0.1$ | | |
| $r_{20} = 129.72$ | | |
| $d_{20} = 3.8$ | $n_{11} = 1.51633$ | $\nu_{11} = 64.15$ |
| $r_{21} = -25.74$ | | |

| $f = 28 \sim 48$, | $f/2.8$ |
|---|---|

In the Embodiments described above, the reference symbols $r_1$ through $r_{21}$ represent radii of curvature on the surfaces of the respective lens elements, the reference symbols $d_1$ through $d_{20}$ designate thicknesses of the respective lens elemnts and airspaces reserved therebetween, the reference symbols $n_1$ through $n_{11}$ denote refractive indices of the respective lens elemnts, the reference symbols $\nu_1$ through $\nu_{11}$ represent Abbe's numbers of the respective lens elements and the reference symbol f designates focal length of the zoom lens system as a whole.

Figure 2:
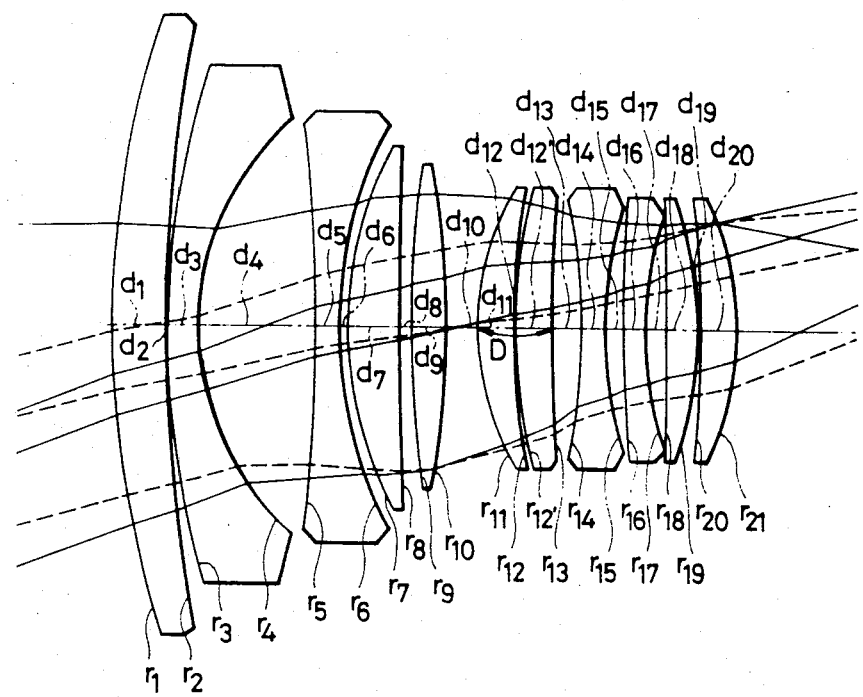
FIG. 2 shows a sectional view illustrating composition of Embodiments 1 and 2 at the tele position of the present invention.
Figure 5:
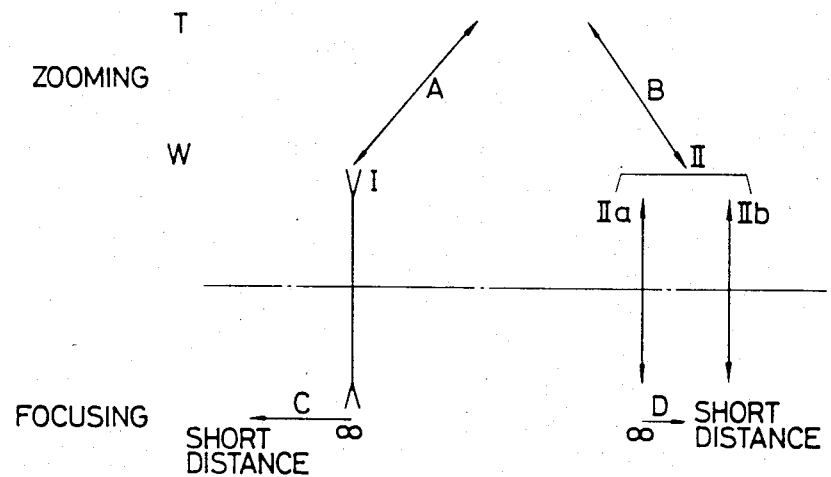
FIG. 5 shows diagrams illustrating lens displacement modes for zooming and focusing the Embodiment 4 of the present invention.

Out of the Embodiments described above, the Embodiment 1 has the lens composition shown in FIG. 1 (wide position) and FIG. 2 (tele position) in which the second lens component of the first subgroup in the rear lens group comprises two positive lens elements forming a thin air lens therebetween.

The Embodiment 2 has the same composition as that of the Embodiment 1 shown in FIG. 1 and FIG. 2.

Figure 3:
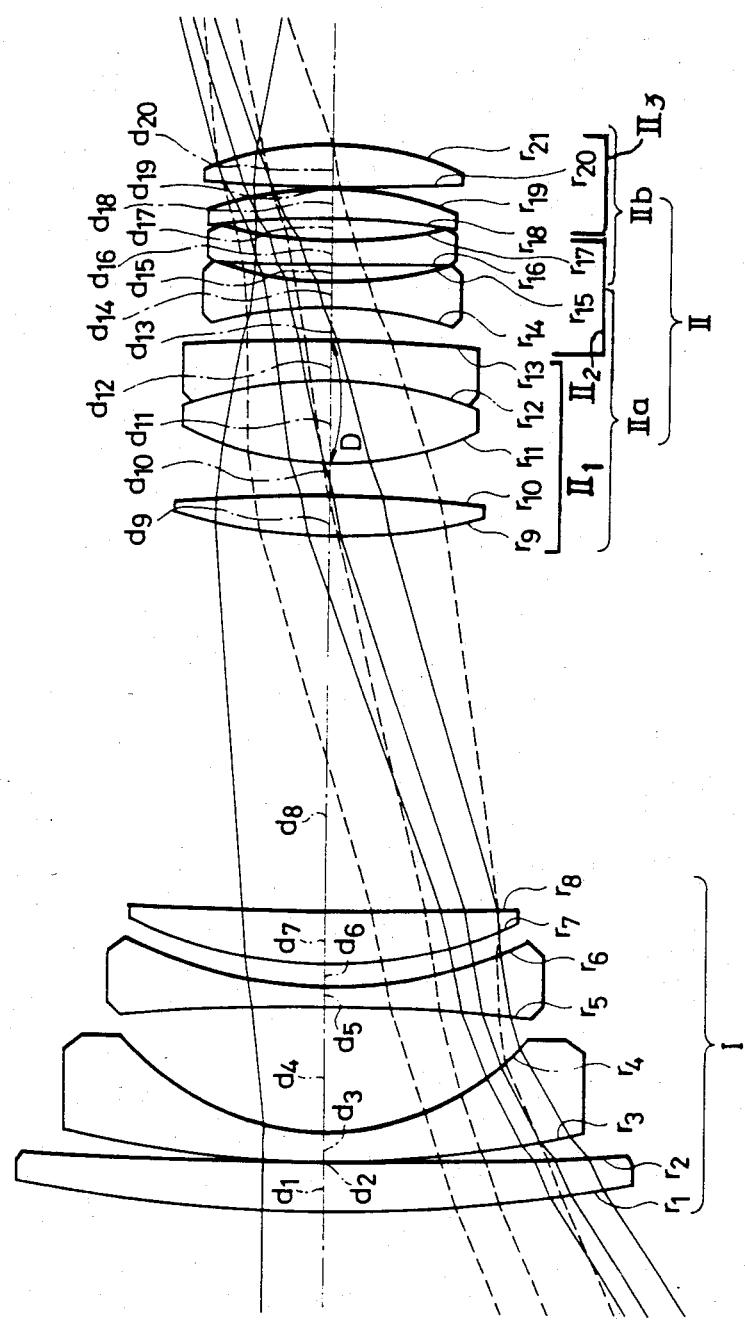
FIG. 3 shows a sectional view illustrating composition of Embodiments 3 and 4 at the wide position of the present invention.
Figure 4:
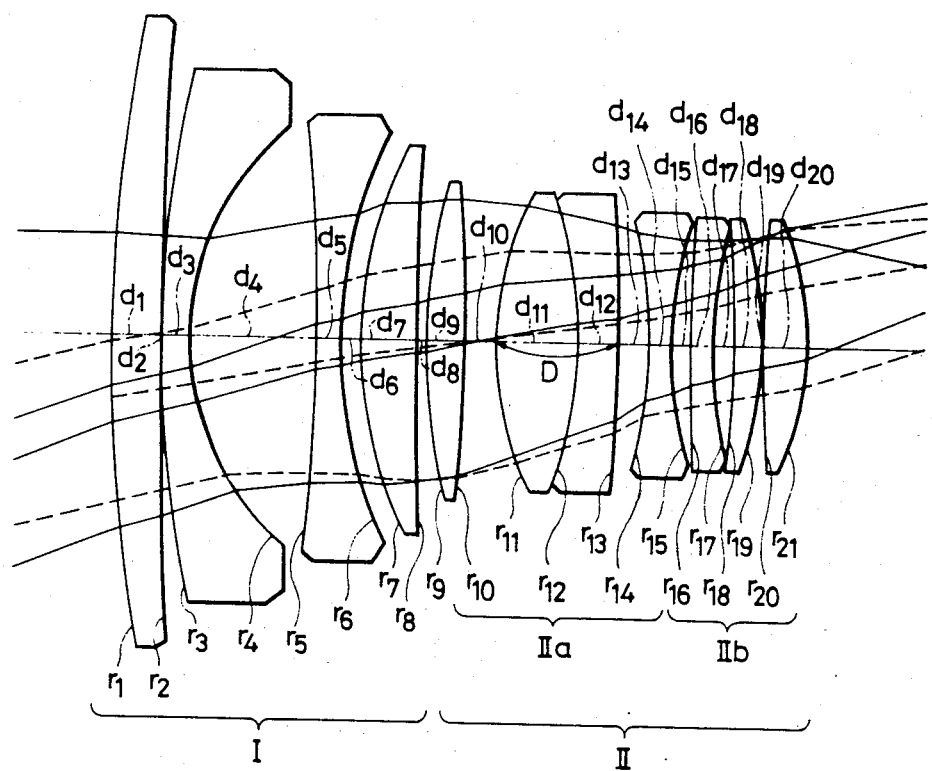
FIG. 4 shows a sectional view illustrating composition of Embodiments 3 and 4 at the tele position of the present invention.
Figure 6:
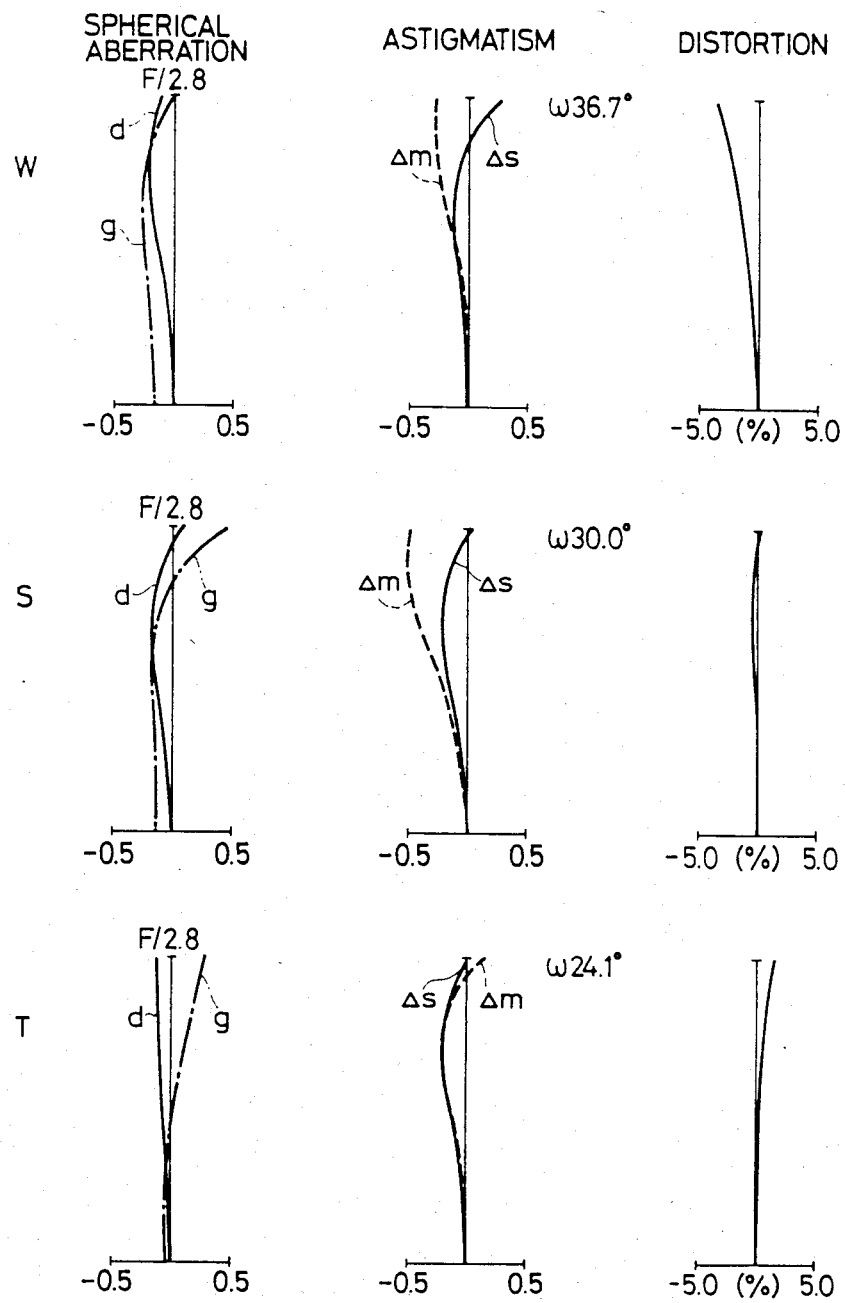
FIG. 6 shows curves illustrating aberration characteristics of the Embodiment 1 of the present invention.
Figure 7:
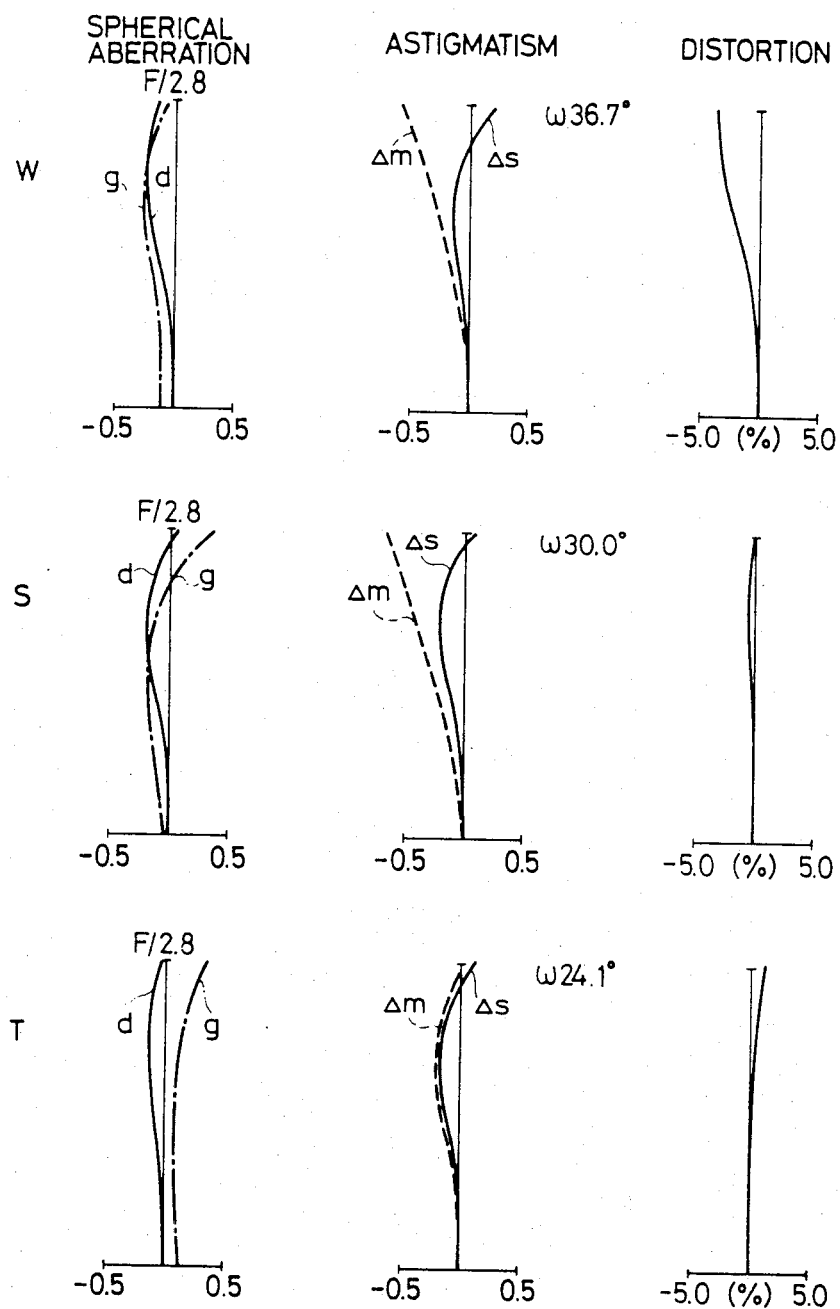
FIG. 7 shows curves illustrating aberration characteristics of the Embodiment 2 of the present invention.
Figure 8:
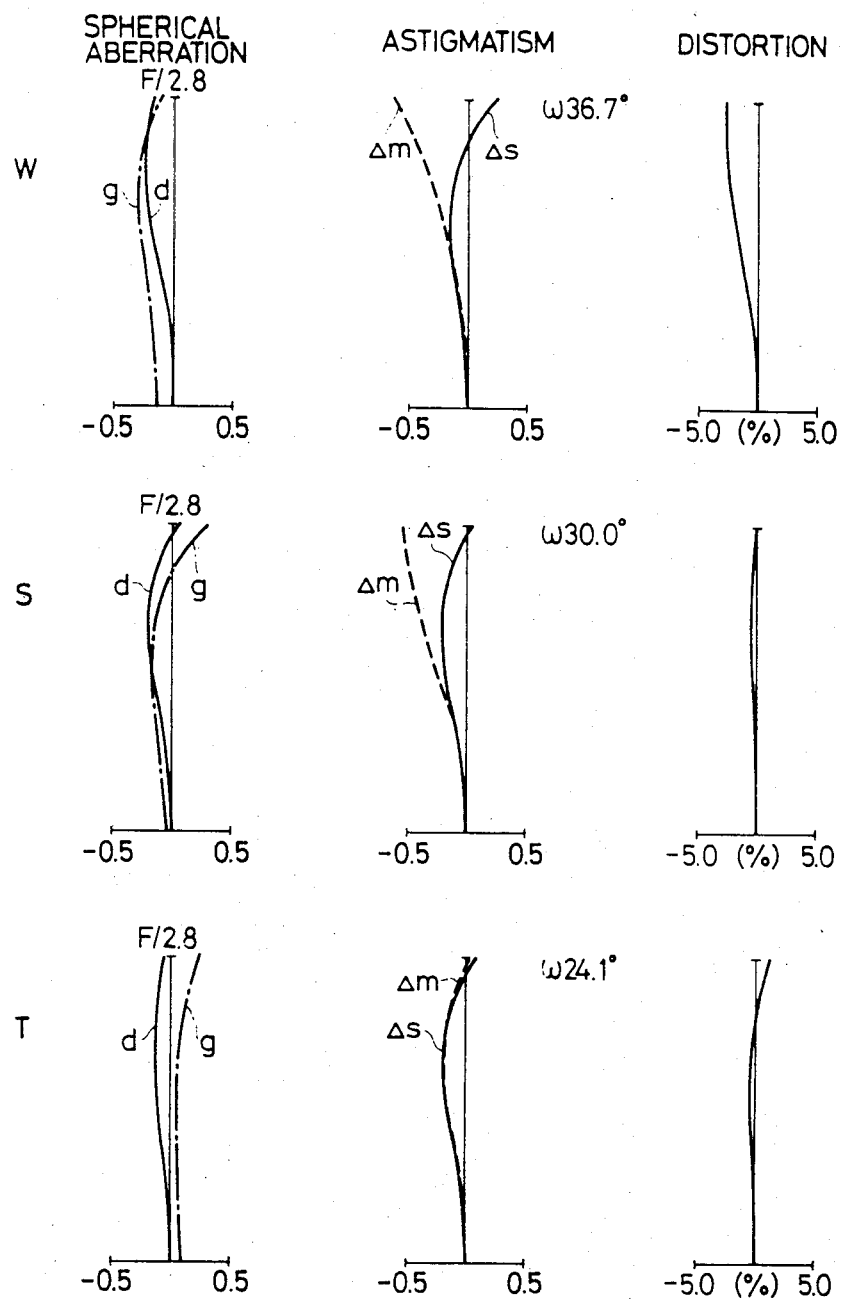
FIG. 8 shows curves illustrating aberration characteristics of the Embodiment 3 of the present invention.

The Embodiment 3 has the composition shown in FIG. 3 (wide position) and FIG. 4 (tele position) in which the second lens component of the first subgroup in the rear lens group is designed as a cemented doublet.

The Embodiment 4 has the same composition as that of the Embodiment 3 in which the second lens component of the first subgroup in the rear lens group is designed also as a cemented doublet.

The Embodiment 4 is focused on objects located within a range from infinite to short distance by displacing the lens components indicated by $II_a$ in FIG. 3 and FIG. 4 (the first subgroup and the negative lens component arranged on the object side in the second subgroup) as a whole toward the image side in conjunction with the displacement of the front lens group toward the object side.

In other words, the front lens group I and rear lens group II are displaced in the directions indicated by the arrows A and B respectively for zooming. For focusing, the rear lens group II is divided into the lens components indicated by IIa and those indicated by IIb (the negative lens component arranged on the image side in the second subgroup and the third subgroup) which are displaced in the directions indicated by the arrows C and D respectively. That is to say, the lens components indicated by IIa are displaced in the direction indicated by the arrow D in conjunction with the displacement of the front lens group I in the direction indicated by the arrow C. The airspace $d_{15}$ which is varied by the displacement is set at 1.42 when the zoom lens system is focused on an object located at a distance of 1 m.

Figure 9:
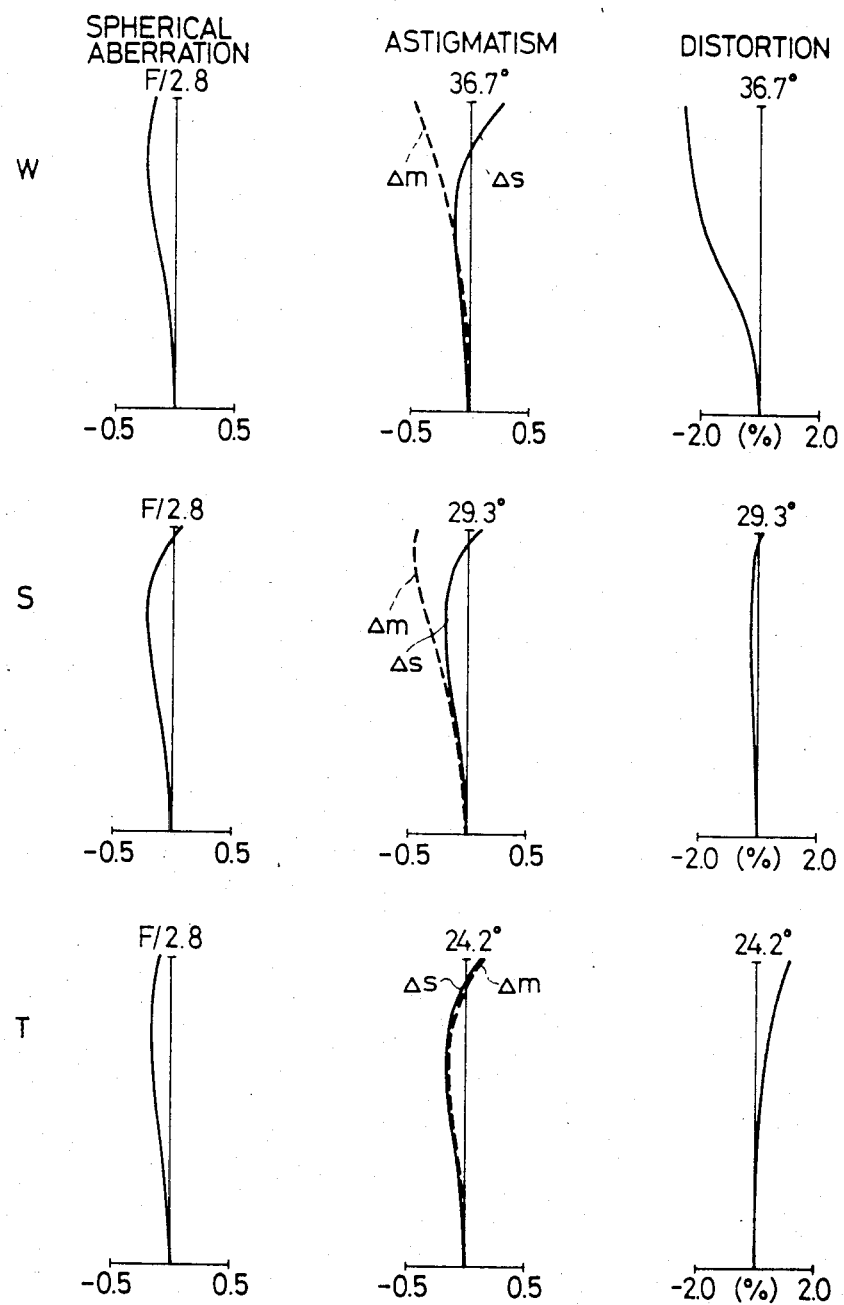
FIG. 9 shows curves illustrating aberration characteristics of the Embodiment 4 of the present invention when it is focused on an object located at infinite distance.
Figure 10:
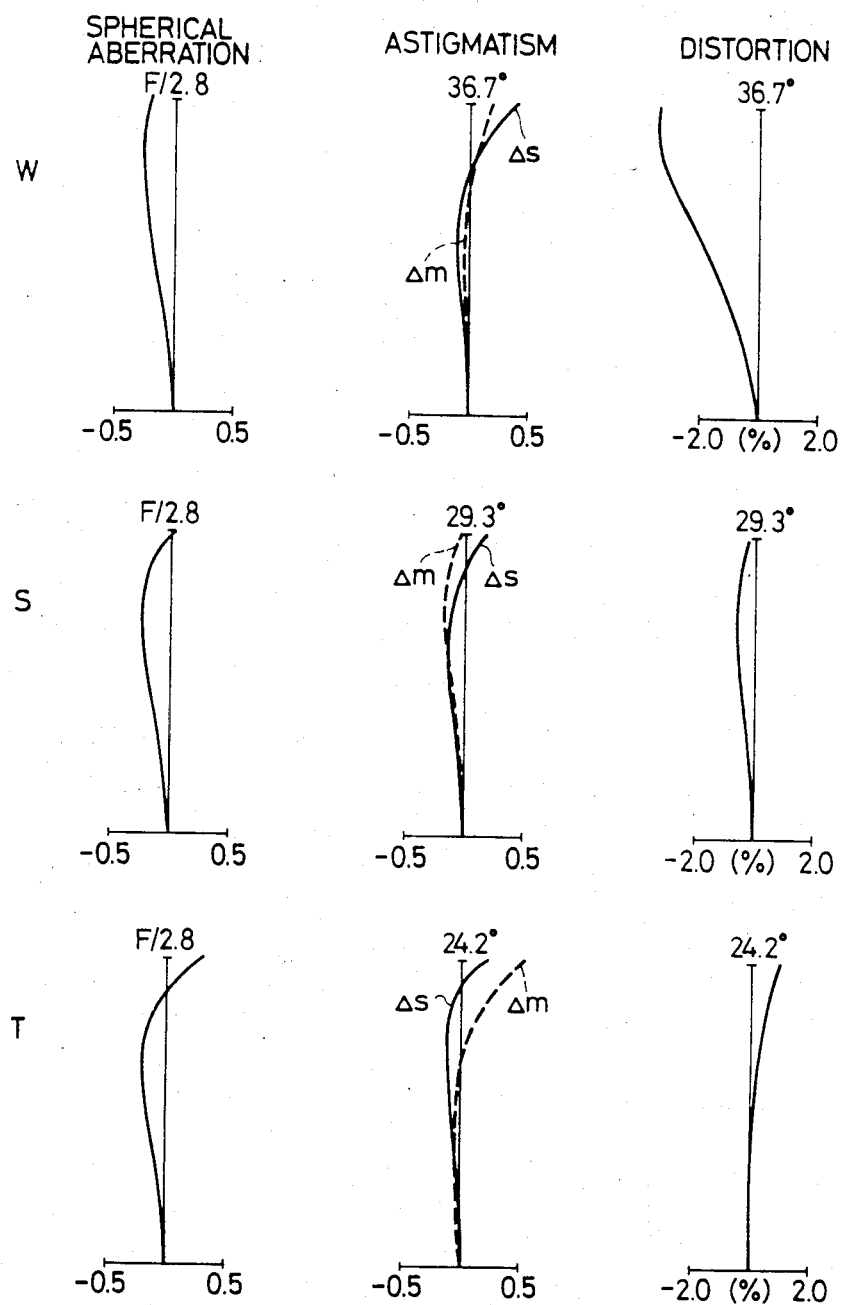
FIG. 10 and FIG. 11 show curves illustrating aberration characteristics of the Embodiment 4 of the present invention when it is focused on an object located at a short distance.
Figure 11:
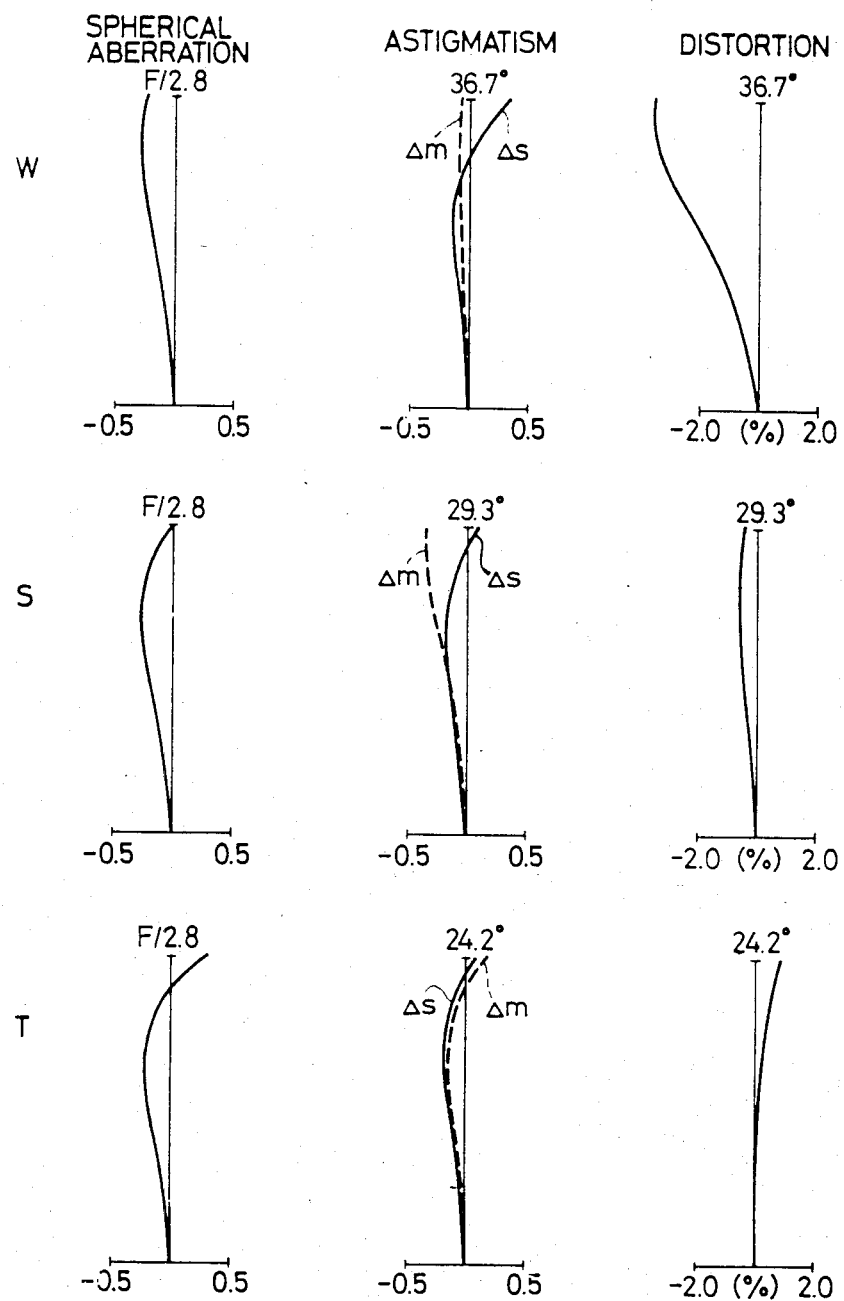

The Embodiment 4 has the aberration characteristics illustrated in FIG. 9 through FIG. 11. Out of these drawings, FIG. 9 illustrates the aberration characteristics of the Embodiment 4 when it is focused on an object located at infinite distance, FIG. 10 illustrates the aberration characteristics of the Embodiment 4 when it is focused on an object located at a distance of 1 m without varying the airspace $d_{15}$ and FIG. 11 illustrates the aberration characteristics of the Embodiment 4 when it is focused on an object located at a distance of 1 m by varying the airspace $d_{15}$.

In FIG. 6 through FIG. 11, the reference symbols W, S and T represent the wide position, standard position and tele position respectively.

As is clear from the foregoing descriptions and preferred Embodiments, the zoom lens system according to the present invention has a large relative aperture of F/2.8 and relatively simple composition. Further it is possible to focus the zoom lens system with little variations of aberrations such as curvature of field by adopting the focusing system described with reference to the Embodiment 4.

I claim:

1. A large-aperture wide-angle zoom lens system comprising a front diverging lens group and a rear converging lens group, and adapted for zooming by varying an airspace reserved between said front diverging lens group and said rear converging lens group having a positive meniscus lens component on the foremost position wherein the object side surface is convex, said converging lens group being composed of a first positive subgroup comprising at least two positive lens components, a second negative subgroup comprising at least two negative lens components and a third positive subgroup comprising at least two positive lens components, said large-aperture wide-angle zoom lens system satisfying the following conditions (1) through (4):

$$0.1 < K < 0.6 \left( K = \frac{r_2 - r_1}{r_1 + r_2} \right) \quad (1)$$

$$0.12 < \frac{D}{f_R} < 0.3 \quad (2)$$

$$0.8 < \frac{r_{17}}{f_w} < 1.8 \quad (3)$$

$$0.6 < \frac{r_{15}}{r_{17}} < 1.5 \quad (4)$$

wherein the reference symbols $r_1$ and $r_2$ represent radii of curvature on both the surfaces of the positive meniscus lens component arranged on the object side in said front diverging lens group, the reference symbol $r_{15}$ designates radius of curvature on the image side surface of the lens component arranged on the object side in the second subgroup of said rear converging lens group, the reference symbol $r_{17}$ denotes radius of curvature on the image side surface of the lens component arranged on the image side in the second subgroup of said rear converging lens group, the reference symbol D represents thickness of the lens component arranged on the image side in the first subgroup of said rear converging lens group, the reference symbol $f_R$ designates focal length of said rear lens group and the reference symbol $f_w$ denotes focal length of the zoom lens system as a whole at its wide position.

2. A large-aperture wide-angle zoom lens system according to claim 1 having the following numerical data:

| | | |
|---|---|---|
| $r_1 = 86.46$ | | |
| $d_1 = 4.3$ | $n_1 = 1.79952$ | $\nu_1 = 42.24$ |
| $r_2 = 132.183$ | | |
| $d_2 = 0.1$ | | |
| $r_3 = 71.220$ | | |
| $d_3 = 2.3$ | $n_2 = 1.79952$ | $\nu_2 = 42.24$ |
| $r_4 = 21.620$ | | |
| $d_4 = 10.16$ | | |
| $r_5 = -134.878$ | | |
| $d_5 = 1.9$ | $n_3 = 1.61272$ | $\nu_3 = 58.75$ |
| $r_6 = 35.017$ | | |
| $d_6 = 0.68$ | | |
| $r_7 = 31.687$ | | |
| $d_7 = 4.5$ | $n_4 = 1.80440$ | $\nu_4 = 39.58$ |
| $r_8 = 863.805$ | | |
| $d_8 = 1$ | | |
| $r_9 = 105.586$ | | |
| $d_9 = 2.8$ | $n_5 = 1.67790$ | $\nu_5 = 55.33$ |
| $r_{10} = -73.593$ | | |
| $d_{10} = 2.7$ | | |
| $r_{11} = 23.548$ | | |
| $d_{11} = 3.11$ | $n_6 = 1.67790$ | $\nu_6 = 55.33$ |
| $r_{12} = 60.879$ | | |
| $d_{12} = 0.1$ | | |
| $r_{12} = 46.676$ | | |
| $d_{12} = 3.24$ | $n_7 = 1.74320$ | $\nu_7 = 49.31$ |
| $r_{13} = 200.793$ | | |
| $d_{13} = 2.36$ | | |
| $r_{14} = -52.334$ | | |
| $d_{14} = 1.93$ | $n_8 = 1.74950$ | $\nu_8 = 35.27$ |
| $r_{15} = 35.412$ | | |
| $d_{15} = 1.5$ | | |
| $r_{16} = 136.095$ | | |
| $d_{16} = 1.93$ | $n_9 = 1.80518$ | $\nu_9 = 25.43$ |
| $r_{17} = 30.396$ | | |
| $d_{17} = 1.79$ | | |
| $r_{18} = -261.802$ | | |
| $d_{18} = 2.50$ | $n_{10} = 1.67790$ | $\nu_{10} = 55.33$ |
| $r_{19} = -34.223$ | | |
| $d_{19} = 0.19$ | | |
| $r_{20} = -142.740$ | | |

-continued

| | | |
|---|---|---|
| $d_{20} = 3.18$ | $n_{11} = 1.51633$ | $v_{11} = 64.15$ |
| $r_{21} = -25.703$ | | |

| | | |
|---|---|---|
| $f = 28.98 \sim 48.3$, | zooming ratio = 1.67 | |
| $f_R = 37.133$, K = 0.209, $D/f_R = 0.174$ | | |
| $r_{17}/f_W = 1.05$, | $r_{15}/r_{17} = 1.165$ | |
| f 28.98 | 37.41 | 48.3 |
| l 30.51 | 13.88 | 0.99 | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, the reference symbols $v_1$ through $v_{11}$ represent Abbe's numbers of the respective lens elements, the reference symbol f designates focal length of said zoom lens system as a whole and the reference symbol l represents a distance between the front diverging lens group and the rear converging lens group.

3. A large-aperture wide-angle zoom lens system according to claim 1 having the following numerical data:

| | | |
|---|---|---|
| $r_1 = 87.236$ | | |
| $d_1 = 4.3$ | $n_1 = 1.8044$ | $v_1 = 39.58$ |
| $r_2 = 146.290$ | | |
| $d_2 = 0.1$ | | |
| $r_3 = 71.286$ | | |
| $d_3 = 2.3$ | $n_2 = 1.79952$ | $v_2 = 42.24$ |
| $r_4 = 21.332$ | | |
| $d_4 = 8.9$ | | |
| $r_5 = -145.246$ | | |
| $d_5 = 1.9$ | $n_3 = 1.61272$ | $v_3 = 58.75$ |
| $r_6 = 39.945$ | | |
| $d_6 = 1.36$ | | |
| $r_7 = 34.035$ | | |
| $d_7 = 4.51$ | $n_4 = 1.8044$ | $v_4 = 39.58$ |
| $r_8 = 341.904$ | | |
| $d_8 = 1$ | | |
| $r_9 = 111.555$ | | |
| $d_9 = 2.8$ | $n_5 = 1.6968$ | $v_5 = 55.5$ |
| $r_{10} = -93.07$ | | |
| $d_{10} = 2.72$ | | |
| $r_{11} = 27.305$ | | |
| $d_{11} = 6.81$ | $n_6$ 32 1.6968 | $v_6 = 55.5$ |
| $r_{12} = -660.765$ | | |
| $d_{12} = 0.1$ | | |
| $r_{12} = 154.016$ | | |
| $d_{12} = 3.2$ | $n_7 = 1.74320$ | $v_7 = 49.3$ |
| $r_{13} = -1831.620$ | | |
| $d_{13} = 2.38$ | | |
| $r_{14} = -36.118$ | | |
| $d_{14} = 1.93$ | $n_8 = 1.74950$ | $v_8 = 35.3$ |
| $r_{15} = 34.322$ | | |
| $d_{15} = 1.5$ | | |
| $r_{16} = 5343.39$ | | |
| $d_{16} = 1.93$ | $n_9 = 1.80518$ | $v_9 = 25.4$ |
| $r_{17} = 45.480$ | | |
| $d_{17} = 1.79$ | | |
| $r_{18} = -90.193$ | | |
| $d_{18} = 2.59$ | $n_{10} = 1.67790$ | $v_{10} = 55.3$ |
| $r_{19} = -32.206$ | | |
| $d_{19} = 0.19$ | | |
| $r_{20} = 193.220$ | | |
| $d_{20} = 3.18$ | $n_{11} = 1.51633$ | $v_{11} = 64.15$ |
| $r_{21} = -24.970$ | | |

| | | |
|---|---|---|
| $f = 28.98 \sim 48.3$, | zooming ratio = 1.67 | |
| $f_R = 38.083$, K = 0.253, $D/f_R = 0.265$ | | |
| $r_{17}/f_W = 1.57$, | $r_{15}/r_{17} = 0.755$ | |
| f 28.98 | 37.41 | 48.3 |
| l 30.49 | 13.84 | 0.92 | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{10}$ denote refractive indices of the respective lens elements, the reference symbols $v_1$ through $v_{11}$ represent Abbe's numbers of the respective lens elements, the reference symbol f designates focal length of said zoom lens system as a whole and the reference symbol l represents a distance between the front diverging lens group and the rear converging lens group.

4. A large-aperture wide-angle zoom lens system according to claim 1 having the following numerical data:

| | | |
|---|---|---|
| $r_1 = 140.081$ | | |
| $d_1 = 4.3$ | $n_1 = 1.80400$ | $v_1 = 39.58$ |
| $r_2 = 500.83$ | | |
| $d_2 = 0.1$ | | |
| $r_3 = 101.646$ | | |
| $d_3 = 2.3$ | $n_2 = 1.79952$ | $v_2 = 42.24$ |
| $r_4 = 22.962$ | | |
| $d_4 = 10.94$ | | |
| $r_5 = 149.484$ | | |
| $d_5 = 1.91$ | $n_3 = 1.61272$ | $v_3 = 58.75$ |
| $r_6 = 40.481$ | | |
| $d_6 = 1.21$ | | |
| $r_7 = 36.257$ | | |
| $d_7 = 4.5$ | $n_4 = 1.80440$ | $v_4 = 39.60$ |
| $r_8 = 1331.308$ | | |
| $d_8 = 1$ | | |
| $r_9 = 51.611$ | | |
| $d_9 = 2.8$ | $n_5 = 1.69680$ | $v_5 = 55.5$ |
| $r_{10} = -159.305$ | | |
| $d_{10} = 2.7$ | | |
| $r_{11} = 31.441$ | | |
| $d_{11} = 6.94$ | $n_6 = 1.69680$ | $v_6 = 55.5$ |
| $r_{12} = -30.955$ | | |
| $d_{12} = 3.37$ | $n_7 = 1.74320$ | $v_7 = 4.93$ |
| $r_{13} = -124.705$ | | |
| $d_{13} = 2.70$ | | |
| $r_{14} = -37.439$ | | |
| $d_{14} = 1.93$ | $n_8 = 1.74950$ | $v_8 = 35.3$ |
| $r_{15} = 35.264$ | | |
| $d_{15} = 1.5$ | | |
| $r_{16} = 190.522$ | | |
| $d_{16} = 1.93$ | $n_9 = 1.80518$ | $v_9 = 25.4$ |
| $r_{17} = 39.912$ | | |
| $d_{17} = 1.79$ | | |
| $r_{18} = -62.347$ | | |
| $d_{18} = 2.59$ | $n_{10} = 1.67790$ | $v_{10} = 55.3$ |
| $r_{19} = -32.103$ | | |
| $d_{19} = 0.19$ | | |
| $r_{20} = 115.799$ | | |
| $d_{20} = 3.18$ | $n_{11} = 1.51633$ | $v_{11} = 64.15$ |
| $r_{21} = -26.387$ | | |

| | | |
|---|---|---|
| $f = 28.98 \sim 48.3$, | zooming ratio = 1.67 | |
| $f_R = 39.18$, K = 0.563, $D/f_R = 0.263$ | | |
| $r_{17}/f_W = 1.38$, | $r_{17}/r_{15} = 0.884$ | |
| f 28.98 | 37.41 | 48.3 |
| l 31.44 | 14.20 | 0.83 | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, the reference symbols $v_1$ through $v_{11}$ represent Abbe's numbers of the respective lens elements, the reference symbol f designates focal length of said zoom lens system as a whole and the reference symbol l represents a distance between the front diverging lens group and the rear converging lens group.

5. A large-aperture wide-angle zoom lens system according to claim 1 having the following numerical data:

| | | |
|---|---|---|
| $r_1 = 136.89$ | | |
| $d_1 = 4.3$ | $n_1 = 1.8044$ | $\nu_1 = 39.58$ |
| $r_2 = 493.22$ | | |
| $d_2 = 0.1$ | | |
| $r_3 = 102.53$ | | |
| $d_3 = 2.3$ | $n_2 = 1.79952$ | $\nu_2 = 42.24$ |
| $r_4 = 23.11$ | | |
| $d_4 = 10.36$ | | |
| $r_5 = -191.0$ | | |
| $d_5 = 1.9$ | $n_3 = 1.61272$ | $\nu_3 = 58.75$ |
| $r_6 = 38.98$ | | |
| $d_6 = 1.6$ | | |
| $r_7 = 35.87$ | | |
| $d_7 = 4.9$ | $n_4 = 1.8044$ | $\nu_4 = 39.58$ |
| $r_8 = 490.18$ | | |
| $d_8 = 31.04 \sim 0.81$ | | |
| $r_9 = 53.95$ | | |
| $d_9 = 3.2$ | $n_5 = 1.69680$ | $\nu_5 = 55.52$ |
| $r_{10} = -141.55$ | | |
| $d_{10} = 2.7$ | | |
| $r_{11} = 30.36$ | | |
| $d_{11} = 6.78$ | $n_6 = 1.69680$ | $\nu_6 = 55.52$ |
| $r_{12} = -36.77$ | | |
| $d_{12} = 3.37$ | $n_7 = 1.74320$ | $\nu_7 = 49.31$ |
| $r_{13} = -130.49$ | | |
| $d_{13} = 2.5$ | | |
| $r_{14} = -37.62$ | | |
| $d_{14} = 1.93$ | $n_8 = 1.74950$ | $\nu_8 = 35.27$ |
| $r_{15} = 34.22$ | | |
| $d_{15} = 1.7$ | | |
| $r_{16} = 301.36$ | | |
| $d_{16} = 1.69$ | $n_9 = 1.80518$ | $\nu_9 = 25.43$ |
| $r_{17} = 41.20$ | | |
| $d_{17} = 1.79$ | | |
| $r_{18} = -71.62$ | | |
| $d_{18} = 2.31$ | $n_{10} = 1.67790$ | $\nu_{10} = 55.33$ |
| $r_{19} = -32.95$ | | |
| $d_{19} = 0.1$ | | |
| $r_{20} = 129.72$ | | |
| $d_{20} = 3.8$ | $n_{11} = 1.51633$ | $\nu_{11} = 64.15$ |
| $r_{21} = -25.75$ | | |
| $f = 29 \sim 48$, | F/2.8 | | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbol f designates focal length of said zoom lens system as a whole and the reference symbol l represents a distance between the front diverging lens group and the rear converging lens group.

6. A large-aperture wide-angle zoom lens system comprising a front diverging lens group and a rear converging lens group, and adapted for zooming by varying an airspace reserved between said front diverging lens group and said rear converging lens group; said converging lens group being composed of a first positive subgroup comprising at least two positive lens components, a second negative subgroup comprising at least two negative lens components and a third positive subgroup comprising at least two positive lens components, said zoom lens system adapted for focusing by displacing said front diverging lens group toward the object side and focusing on an object located at an extremely short distance by further displacing the first subgroup only toward the object side in said rear lens group.

7. A large-aperture wide-angle zoom lens system according to claim 6 having the following numerical data:

| | | |
|---|---|---|
| $r_1 = 86.46$ | | |
| $d_1 = 4.3$ | $n_1 = 1.79952$ | $\nu_1 = 42.24$ |
| $r_2 = 132.183$ | | |
| $d_2 = 0.1$ | | |
| $r_3 = 71.220$ | | |
| $d_3 = 2.3$ | $n_2 = 1.79952$ | $\nu_2 = 42.24$ |
| $r_4 = 21.620$ | | |
| $d_4 = 10.16$ | | |
| $r_5 = -134.878$ | | |
| $d_5 = 1.9$ | $n_3 = 1.61272$ | $\nu_3 = 58.75$ |
| $r_6 = 35.017$ | | |
| $d_6 = 0.68$ | | |
| $r_7 = 31.687$ | | |
| $d_7 = 4.5$ | $n_4 = 1.80440$ | $\nu_4 = 39.58$ |
| $r_8 = 863.805$ | | |
| $d_8 = l$ | | |
| $r_9 = 105.586$ | | |
| $d_9 = 2.8$ | $n_5 = 1.67790$ | $\nu_5 = 55.33$ |
| $r_{10} = -73.593$ | | |
| $d_{10} = 2.7$ | | |
| $r_{11} = 23.548$ | | |
| $d_{11} = 3.11$ | $n_6 = 1.67790$ | $\nu_6 = 55.33$ |
| $r_{12} = 60.879$ | | |
| $d_{12} = 0.1$ | | |
| $r_{12} = 46.676$ | | |
| $d_{12} = 3.24$ | $n_7 = 1.74320$ | $\nu_7 = 49.31$ |
| $r_{13} = 200.793$ | | |
| $d_{13} = 2.36$ | | |
| $r_{14} = -52.334$ | | |
| $d_{14} = 1.93$ | $n_8 = 1.74950$ | $\nu_8 = 35.27$ |
| $r_{15} = 35.412$ | | |
| $d_{15} = 1.5$ | | |
| $r_{16} = 136.095$ | | |
| $d_{16} = 1.93$ | $n_9 = 1.80518$ | $\nu_9 = 25.43$ |
| $r_{17} = 30.396$ | | |
| $d_{17} = 1.79$ | | |
| $r_{18} = -261.802$ | | |
| $d_{18} = 2.50$ | $n_{10} = 1.67790$ | $\nu_{10} = 55.33$ |
| $r_{19} = -34.223$ | | |
| $d_{19} = 0.19$ | | |
| $r_{20} = -142.740$ | | |
| $d_{20} = 3.18$ | $n_{11} = 1.51633$ | $\nu_{11} = 64.15$ |
| $r_{21} = -25.703$ | | |

$f = 28.98 \sim 48.3$, zooming ratio = 1.67
$f_R = 37.133$, K = 0.209, $D/f_R = 0.174$
$r_{17}/f_W = 1.05$, $r_{15}/r_{17} = 1.165$

| f | 28.98 | 37.41 | 48.3 |
|---|---|---|---|
| l | 30.51 | 13.88 | 0.99 | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbol f designates focal length of said zoom lens system as a whole and the reference symbol l represents a distance between the front diverging lens group and the rear converging lens group.

8. A large-aperture wide-angle zoom lens system according to claim 6 having the following numerical data:

| | | |
|---|---|---|
| $r_1 = 87.236$ | | |
| $d_1 = 4.3$ | $n_1 = 1.8044$ | $\nu_1 = 39.58$ |
| $r_2 = 146.290$ | | |
| $d_2 = 0.1$ | | |
| $r_3 = 71.286$ | | |
| $d_3 = 2.3$ | $n_2 = 1.79952$ | $\nu_2 = 42.24$ |
| $r_4 = 21.332$ | | |

-continued

| | | |
|---|---|---|
| $d_4 = 8.9$ | | |
| $r_5 = -145.246$ | | |
| $d_5 = 1.9$ | $n_3 = 1.61272$ | $\nu_3 = 58.75$ |
| $r_6 = 39.945$ | | |
| $d_6 = 1.36$ | | |
| $r_7 = 34.035$ | | |
| $d_7 = 4.51$ | $n_4 = 1.8044$ | $\nu_4 = 39.58$ |
| $r_8 = 341.904$ | | |
| $d_8 = 1$ | | |
| $r_9 = 111.555$ | | |
| $d_9 = 2.8$ | $n_5 = 1.6968$ | $\nu_5 = 55.5$ |
| $r_{10} = -93.07$ | | |
| $d_{10} = 2.72$ | | |
| $r_{11} = 27.305$ | | |
| $d_{11} = 6.81$ | $n_6 = 1.6968$ | $\nu_6 = 55.5$ |
| $r_{12} = -660.765$ | | |
| $d_{12} = 0.1$ | | |
| $r_{12} = 154.016$ | | |
| $d_{12} = 3.2$ | $n_7 = 1.74320$ | $\nu_7 = 49.3$ |
| $r_{13} = -1831.620$ | | |
| $d_{13} = 2.38$ | | |
| $r_{14} = -36.118$ | | |
| $d_{14} = 1.93$ | $n_8 = 1.74950$ | $\nu_8 = 35.3$ |
| $r_{15} = 34.322$ | | |
| $d_{15} = 1.5$ | | |
| $r_{16} = 5343.39$ | | |
| $d_{16} = 1.93$ | $n_9 = 1.80518$ | $\nu_9 = 25.4$ |
| $r_{17} = 45.480$ | | |
| $d_{17} = 1.79$ | | |
| $r_{18} = -90.193$ | | |
| $d_{18} = 2.59$ | $n_{10} = 1.67790$ | $\nu_{10} = 55.3$ |
| $r_{19} = -32.206$ | | |
| $d_{19} = 0.19$ | | |
| $r_{20} = 193.220$ | | |
| $d_{20} = 3.18$ | $n_{11} = 1.51633$ | $\nu_{11} = 64.15$ |
| $r_{21} = -24.970$ | | |

| | | |
|---|---|---|
| $f = 28.98 \sim 48.3$, | zooming ratio $= 1.67$ | |
| $f_R = 38.083$, $K = 0.253$, | $D/f_R = 0.265$ | |
| $r_{17}/f_W = 1.57$, | $r_{15}/r_{17} = 0.755$ | |
| f  28.98 | 37.41 | 48.3 |
| l  30.49 | 13.84 | 0.92 | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{10}$ denote refractive indices of the respective lens elements, the reference symbols $\nu_1$ through $\nu_{11}$ represent Abbe's numbers of the respective lens elements, the reference symbol f designates focal length of said zoom lens system as a whole and the reference symbol l represents a distance between the front diverging lens group and the rear convering lens group.

9. A large-aperture wide-angle zoom lens system according to claim 6 having the following numerical data:

| | | |
|---|---|---|
| $r_1 = 140.081$ | | |
| $d_1 = 4.3$ | $n_1 = 1.80400$ | $\nu_1 = 39.58$ |
| $r_2 = 500.83$ | | |
| $d_2 = 0.1$ | | |
| $r_3 = 101.646$ | | |
| $d_3 = 2.3$ | $n_2 = 1.79952$ | $\nu_2 = 42.24$ |
| $r_4 = 22.962$ | | |
| $d_4 = 10.94$ | | |
| $r_5 = 149.484$ | | |
| $d_5 = 1.91$ | $n_3 = 1.61272$ | $\nu_3 = 58.75$ |
| $r_6 = 40.481$ | | |
| $d_6 = 1.21$ | | |
| $r_7 = 36.257$ | | |
| $d_7 = 4.5$ | $n_4 = 1.80440$ | $\nu_4 = 39.60$ |
| $r_8 = 1331.308$ | | |
| $d_8 = 1$ | | |
| $r_9 = 51.611$ | | |
| $d_9 = 2.8$ | $n_5 = 1.69680$ | $\nu_5 = 55.5$ |
| $r_{10} = -159.305$ | | |
| $d_{10} = 2.7$ | | |
| $r_{11} = 31.441$ | | |
| $d_{11} = 6.94$ | $n_6 = 1.69680$ | $\nu_6 = 55.5$ |
| $r_{12} = -30.955$ | | |
| $d_{12} = 3.37$ | $n_7 = 1.74320$ | $\nu_7 = 49.3$ |
| $r_{13} = -124.705$ | | |
| $d_{13} = 2.70$ | | |
| $r_{14} = -37.439$ | | |
| $d_{14} = 1.93$ | $n_8 = 1.74950$ | $\nu_8 = 35.3$ |
| $r_{15} = 35.264$ | | |
| $d_{15} = 1.5$ | | |
| $r_{16} = 190.522$ | | |
| $d_{16} = 1.93$ | $n_9 = 1.80518$ | $\nu_9 = 25.4$ |
| $r_{17} = 39.912$ | | |
| $d_{17} = 1.79$ | | |
| $r_{18} = -62.347$ | | |
| $d_{18} = 2.59$ | $n_{10} = 1.67790$ | $\nu_{10} = 55.3$ |
| $r_{19} = -32.103$ | | |
| $d_{19} = 0.19$ | | |
| $r_{20} = 115.799$ | | |
| $d_{20} = 3.18$ | $n_{11} = 1.51633$ | $\nu_{11} = 64.15$ |
| $r_{21} = -26.387$ | | |

| | | |
|---|---|---|
| $f = 28.98 \sim 48.3$, | zooming ratio $= 1.67$ | |
| $f_R = 39.18$, $K = 0.563$, | $D/f_R = 0.263$ | |
| $r_{17}/f_W = 1.38$, | $r_{17}/r_{15} = 0.884$ | |
| f  28.98 | 37.41 | 48.3 |
| l  31.44 | 14.20 | 0.83 | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbol f designates focal length of said zoom lens system as a whole and the reference symbol l represents a distance between the front diverging lens group and the rear converging lens group.

10. A large-aperture wide-angle zoom lens system comprising a front diverging lens group and a rear converging lens group, and adapted for zooming by varying an airspace reserved between said front diverging lens group and said rear converging lens group, said converging lens group being composed of a first positive subgroup comprising at least two positive lens components, a second negative subgroups comprising at least two negative lens components and a third positive subgroup comprising at least two positive lens components, said zoom lens system adapted for focusing on objects located within a range from infinite to short distance by displacing said front diverging lens group toward the object side and varying a predetermined airspace in said rear converging lens group in conjunction with said displacement of said front diverging lens group.

11. A large-aperture wide-angle zoom lens system according to claim 10 having the following numerical data:

| | | |
|---|---|---|
| $r_1 = 136.89$ | | |
| $d_1 = 4.3$ | $n_1 = 1.8044$ | $\nu_1 = 39.58$ |
| $r_2 = 493.22$ | | |
| $d_2 = 0.1$ | | |
| $r_3 = 102.53$ | | |
| $d_3 = 2.3$ | $n_2 = 1.79952$ | $\nu_2 = 42.24$ |
| $r_4 = 23.11$ | | |
| $d_4 = 10.36$ | | |
| $r_5 = -191.0$ | | |
| $d_5 = 1.9$ | $n_3 = 1.61272$ | $\nu_3 = 58.75$ |

-continued

| | | |
|---|---|---|
| $r_6 = 38.98$ | | |
| $d_6 = 1.6$ | | |
| $r_7 = 35.87$ | | |
| $d_7 = 4.9$ | $n_4 = 1.8044$ | $\nu_4 = 39.58$ |
| $r_8 = 490.18$ | | |
| $d_8 = 31.04 \sim 0.81$ | | |
| $r_9 = 53.95$ | | |
| $d_9 = 3.2$ | $n_5 = 1.69680$ | $\nu_5 = 55.52$ |
| $r_{10} = -141.55$ | | |
| $d_{10} = 2.7$ | | |
| $r_{11} = 30.36$ | | |
| $d_{11} = 6.78$ | $n_6 = 1.69680$ | $\nu_6 = 55.52$ |
| $r_{12} = -36.77$ | | |
| $d_{12} = 3.37$ | $n_7 = 1.74320$ | $\nu_7 = 49.31$ |
| $r_{13} = -130.49$ | | |
| $d_{13} = 2.5$ | | |
| $r_{14} = -37.62$ | | |
| $d_{14} = 1.93$ | $n_8 = 1.74950$ | $\nu_8 = 35.27$ |
| $r_{15} = 34.22$ | | |
| $d_{15} = 1.7$ | | |
| $r_{16} = 301.36$ | | |
| $d_{16} = 1.69$ | $n_9 = 1.80518$ | $\nu_9 = 25.43$ |
| $r_{17} = 41.20$ | | |
| $d_{17} = 1.79$ | | |
| $r_{18} = -71.62$ | | |
| $d_{18} = 2.31$ | $n_{10} = 1.67790$ | $\nu_{10} = 55.33$ |
| $r_{19} = -32.95$ | | |
| $d_{19} = 0.1$ | | |
| $r_{20} = 129.72$ | | |
| $d_{20} = 3.8$ | $n_{11} = 1.51633$ | $\nu_{11} = 64.15$ |
| $r_{21} = -25.74$ | | |
| $f = 29 \sim 48$, | F/2.8 | | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbol f designates focal length of said zoom lens system as a whole and the reference symbol l represents a distance between the front diverging lens group and the rear converging lens group.

12. A large-aperture wide-angle zoom lens system comprising a front diverging lens group and a rear converging lens group, and adapted for zooming by varying an airspace reserved between said front diverging lens group and said rear converging lens group, said converging lens group being composed of a first positive subgroup comprising at least two positive lens components, a second negative subgroup comprising at least two negative lens components and a third positive subgroup comprising at least two positive lens components, said zoom lens system adapted for focusing on objects located within a range from infinite to short distance by displacing said front diverging lens group toward the object side and varying an airspace through which paraxial rays pass substantially parallelly with the optical axis in said rear converging lens group in conjunction with said displacement of said front diverging lens group.

13. A large-aperture wide-angle zoom lens system according to claim 12 having the following numerical data:

| | | |
|---|---|---|
| $r_1 = 136.89$ | | |
| $d_1 = 4.3$ | $n_1 = 1.8044$ | $\nu_1 = 39.58$ |
| $r_2 = 493.22$ | | |
| $d_2 = 0.1$ | | |

-continued

| | | |
|---|---|---|
| $r_3 = 102.53$ | | |
| $d_3 = 2.3$ | $n_2 = 1.79952$ | $\nu_2 = 42.24$ |
| $r_4 = 23.11$ | | |
| $d_4 = 10.36$ | | |
| $r_5 = -191.0$ | | |
| $d_5 = 1.9$ | $n_3 = 1.61272$ | $\nu_3 = 58.75$ |
| $r_6 = 38.98$ | | |
| $d_6 = 1.6$ | | |
| $r_7 = 35.87$ | | |
| $d_7 = 4.9$ | $n_4 = 1.8044$ | $\nu_4 = 39.58$ |
| $r_8 = 490.18$ | | |
| $d_8 = 31.04 \sim 0.81$ | | |
| $r_9 = 53.95$ | | |
| $d_9 = 3.2$ | $n_5 = 1.69680$ | $\nu_5 = 55.52$ |
| $r_{10} = -141.55$ | | |
| $d_{10} = 2.7$ | | |
| $r_{11} = 30.36$ | | |
| $d_{11} = 6.78$ | $n_6 = 1.69680$ | $\nu_6 = 55.52$ |
| $r_{12} = -36.77$ | | |
| $d_{12} = 3.37$ | $n_7 = 1.74320$ | $\nu_7 = 49.31$ |
| $r_{13} = -130.49$ | | |
| $d_{13} = 2.5$ | | |
| $r_{14} = -37.62$ | | |
| $d_{14} = 1.93$ | $n_8 = 1.74950$ | $\nu_8 = 35.27$ |
| $r_{15} = 34.22$ | | |
| $d_{15} = 1.7$ | | |
| $r_{16} = 301.36$ | | |
| $d_{16} = 1.69$ | $n_9 = 1.80518$ | $\nu_9 = 25.43$ |
| $r_{17} = 41.20$ | | |
| $d_{17} = 1.79$ | | |
| $r_{18} = -71.62$ | | |
| $d_{18} = 2.31$ | $n_{10} = 1.67790$ | $\nu_{10} = 55.33$ |
| $r_{19} = -32.95$ | | |
| $d_{19} = 0.1$ | | |
| $r_{20} = 129.72$ | | |
| $d_{20} = 3.8$ | $n_{11} = 1.51633$ | $\nu_{11} = 64.15$ |
| $r_{21} = -25.74$ | | |
| $f = 29 \sim 48$, | F/2.8 | | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbol f designates focal length of said zoom lens system as a whole and the reference symbol l represents a distance between the front diverging lens group and the rear converging lens group.

14. A large-aperture wide-angle zoom lens system according to claim 13 adapted for focusing by varying the airspace $d_{15}$ in conjunction with the displacement of said front diverging lens group toward the object side.

15. A large-aperture wide-angle zoom lens system comprising a front diverging lens group and a rear converging lens group, and adapted for zooming by varying an airspace reserved between said front diverging lens group and said rear converging lens group, said converging lens groub being composed of a first positive subgroup comprising at least two positive lens components, a second negative subgroup comprising at least two negative lens components and a third positive subgroup comprising at least two positive lens components, said zoom lens system adapted for focusing on objects located within a range from infinite to short distance by displacing said front diverging lens group toward the object side, and shifting the first subgroup and the lens component arranged on the object side in the second subgroup of said rear converging lens group as a whole toward the image side in conjunction with said displacement of said front diverging lens group.

16. A large-aperture wide-angle zoom lens system according to claim 15 having the following numerical data:

| | | |
|---|---|---|
| $r_1 = 136.89$ | | |
| $d_1 = 4.3$ | $n_1 = 1.8044$ | $\nu_1 = 39.58$ |
| $r_2 = 493.22$ | | |
| $d_2 = 0.1$ | | |
| $r_3 = 102.53$ | | |
| $d_3 = 2.3$ | $n_2 = 1.79952$ | $\nu_2 = 42.24$ |
| $r_4 = 23.11$ | | |
| $d_4 = 10.36$ | | |
| $r_5 = -191.0$ | | |
| $d_5 = 1.9$ | $n_3 = 1.61272$ | $\nu_3 = 58.75$ |
| $r_6 = 38.98$ | | |
| $d_6 = 1.6$ | | |
| $r_7 = 35.87$ | | |
| $d_7 = 4.9$ | $n_4 = 1.8044$ | $\nu_4 = 39.58$ |
| $r_8 = 490.18$ | | |
| $d_8 = 31.04 \sim 0.81$ | | |
| $r_9 = 53.95$ | | |
| $d_9 = 3.2$ | $n_5 = 1.69680$ | $\nu_5 = 55.52$ |
| $r_{10} = -141.55$ | | |
| $d_{10} = 2.7$ | | |
| $r_{11} = 30.36$ | | |
| $d_{11} = 6.78$ | $n_6 = 1.69680$ | $\nu_6\ 32\ 55.52$ |
| $r_{12} = -36.77$ | | |
| $d_{12} = 3.37$ | $n_7 = 1.74320$ | $\nu_7 = 49.31$ |
| $r_{13} = -130.49$ | | |
| $d_{13} = 2.5$ | | |
| $r_{14} = -37.62$ | | |
| $d_{14} = 1.93$ | $n_8 = 1.74950$ | $\nu_8 = 35.27$ |
| $r_{15} = 34.22$ | | |
| $d_{15} = 1.7$ | | |
| $r_{16} = 301.36$ | | |
| $d_{16} = 1.69$ | $n_9 = 1.80518$ | $\nu_9 = 25.43$ |
| $r_{17} = 41.20$ | | |
| $d_{17} = 1.79$ | | |
| $r_{18} = -71.62$ | | |
| $d_{18} = 2.31$ | $n_{10} = 1.67790$ | $\nu_{10} = 55.33$ |
| $r_{19} = -32.95$ | | |
| $d_{19} = 0.1$ | | |
| $r_{20} = 129.72$ | | |
| $d_{20} = 3.8$ | $n_{11} = 1.51633$ | $\nu_{11} = 64.15$ |
| $r_{21} = -25.74$ | | |
| $f = 29 \sim 48$, | F/2.8 | | wherein the reference symbols $r_1$ through $r_{21}$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbol f designates focal length of said zoom lens system as a whole and the reference symbol l represents a distance between the front diverging lens group and the rear converging lens group.

* * * * *